United States Patent [19]

Perry et al.

[11] 3,961,173

[45] June 1, 1976

[54] HEAT UNIT INTEGRATOR FOR X-RAY TUBES

[75] Inventors: John T. Perry, Salt Lake City, Utah; Joel J. Schmutzer, Oak Park, Ill.

[73] Assignee: Varian Associates, Palo Alto, Calif.

[22] Filed: Nov. 20, 1974

[21] Appl. No.: 525,423

[52] U.S. Cl. .................. 235/184; 250/413; 250/416 R; 317/40 R; 324/142

[51] Int. Cl.² .................. G06G 7/56; H02H 5/04

[58] Field of Search .............. 317/40; 235/184, 194; 324/142; 250/401, 402, 403, 404, 406, 413, 414, 416

[56] References Cited

UNITED STATES PATENTS

| | | | |
|---|---|---|---|
| 3,634,871 | 1/1972 | Siedband et al. | 317/40 R |
| 3,746,851 | 7/1973 | Gilbert | 324/142 |
| 3,747,605 | 7/1973 | Cook | 324/142 |
| 3,764,908 | 10/1973 | Elms | 324/142 |
| 3,766,391 | 10/1973 | Siedband et al. | 250/403 |
| 3,775,683 | 11/1973 | Barta et al. | 324/142 |
| 3,838,285 | 9/1974 | Siedband et al. | 250/413 |

*Primary Examiner*—Felix D. Gruber
*Attorney, Agent, or Firm*—Stanley Z. Cole; Leon F. Herbert; Richard B. Nelson

[57] ABSTRACT

Apparatus to indicate the temperature of an X-ray tube target includes an analog storage circuit to simulate the heat energy stored. Input signals representing the current and the voltage of the electron beam in the tube are multiplied to give a signal representing the instantaneous power input. The power signal is integrated in the storage circuit to give a temperature signal representing the total heat input. The temperature signal is dissipated by a cooling curve circuit representing the heat loss with time. An indicator reads the temperature signal.

Input voltage and current signals are processed to refer them to ground before multiplication. The current signal is corrected to set its zero value. The voltage signal derived from a transformer primary is corrected for transformer regulation. To eliminate spurious inputs the power signal is gated to the storage circuit only when a measured current is flowing. Multiple storage circuits indicating a number of tubes remember the temperature of their own targets while the power signal and the temperature indicator are being used with another storage circuit.

11 Claims, 3 Drawing Figures

FIG. I

HEAT UNIT INTEGRATOR FOR X-RAY TUBES

FIELD OF THE INVENTION

The invention pertains to instrumentation for monitoring the status of X-ray tubes and protection against failure. In rotating-target X-ray tubes the heat input to the target occurs during short exposures while the heat dissipation is mainly by radiation and covers a time span of many minutes. The previous operating history thus greatly affects the temperature reached in a subsequent exposure. A monitor of the instantaneous temperature is valuable for operator programming of exposure and for over-temperature interlock protection.

PRIOR ART

Devices have been made to measure directly the temperature of a rotating target. For example, U.S. Pat. No. 3,062,960 issued Nov. 6, 1962 to J. Laser describes a photocell focused on the target. Such devices are expensive, and require either a window in the tube wall which can become coated with vaporized material or incorporation of the device itself inside the tube where it can become coated directly.

A more practical monitor has been a separate analog electric circuit with properties simulating the thermal properties of the target. U.S. Pat. No. 3,334,871 issued Jan. 11, 1972 to Melvin P. Siedband describes a storage condenser whose voltage simulates the target temperature. Input current to the condenser simulates the power input to the target and a resistive discharging bleeder across the condenser simulates the radiation cooling.

U.S. patent application Ser. No. 514,157 by John T. Perry, James Grichnik and Joel J. Schmutzer filed Oct. 11, 1974 and assigned to the present assignee describes a more accurate condenser simulator used as an element in a system to predict failure of an X-ray tube.

Although prior condenser integrators provided substantial advances in the art, they are greatly improved by the present invention. In the prior art the tube's beam power was measured by multiplying signals representing the current and voltage. These signals were obtained from a series resistor in the current supply and from the primary voltage of the X-ray transformer. Typical transformer secondary windings are grounded at a center tap and the primaries are across the power line, so the current and voltage signals are not referenced to the same ground. This introduces errors into the circuit multiplying the two signals. Another error arises in measuring very small current inputs when displacement and leakage currents give false current signal readings even when no true electron current flows in the tube. Voltage measurement at the transformer primary is in error because the secondary voltage falls with current drawn—the "regulation" characteristic of the transformer. Another source of error arises because the power input occurs over very short exposure intervals while the cooling time may be very long. Even a small spurious power input signal integrated over the long cooling time may be comparable to the true power signal over the short exposure time.

SUMMARY OF THE INVENTION

The present invention provides an improved heat unit integrator which eliminates the above cited difficulties and further provides for monitoring the temperatures of the targets of several tubes used interchangeably in the same equipment.

The integrator employs electric charge storage in a condenser to simulate tube target temperature.

Current and voltage signals from the X-ray transformer are processed through ground-referencing circuits to give signals referred to a common ground. Zero error in the current signal is cancelled by a balancing bias. Regulation error in the X-ray transformer is compensated by an amplifier for the voltage signal whose gain is controlled by the current signal. The corrected input signals are multiplied to give a power signal which is integrated in the condenser to give a heat storage signal. To eliminate integration of spurious low-level power signals, a gate switches the power signal into the integrator only when the current exceeds a minimum threshold. A resistor network across the condenser bleeds off current to simulate cooling. The non-exponential cooling rate is simulated by several parallel resistors which are sequentially switched in to the circuit by gates controlled by the instantaneous condenser voltage. An indicator circuit senses the condenser voltage, which is displayed and/or used to control protective interlocks. Several independent integrator circuits may be used to simulate several tubes, the power input signal and the indicator sensing input being switched to the appropriate integrator while the other integrators retain their temperature signals.

DESCRIPTION OF THE INVENTION

The invention can best be understood by illustration of a preferred embodiment shown in the figures. It is clear that other embodiments containing one or more of the unique features can fall within the scope of the invention.

Figure 1:
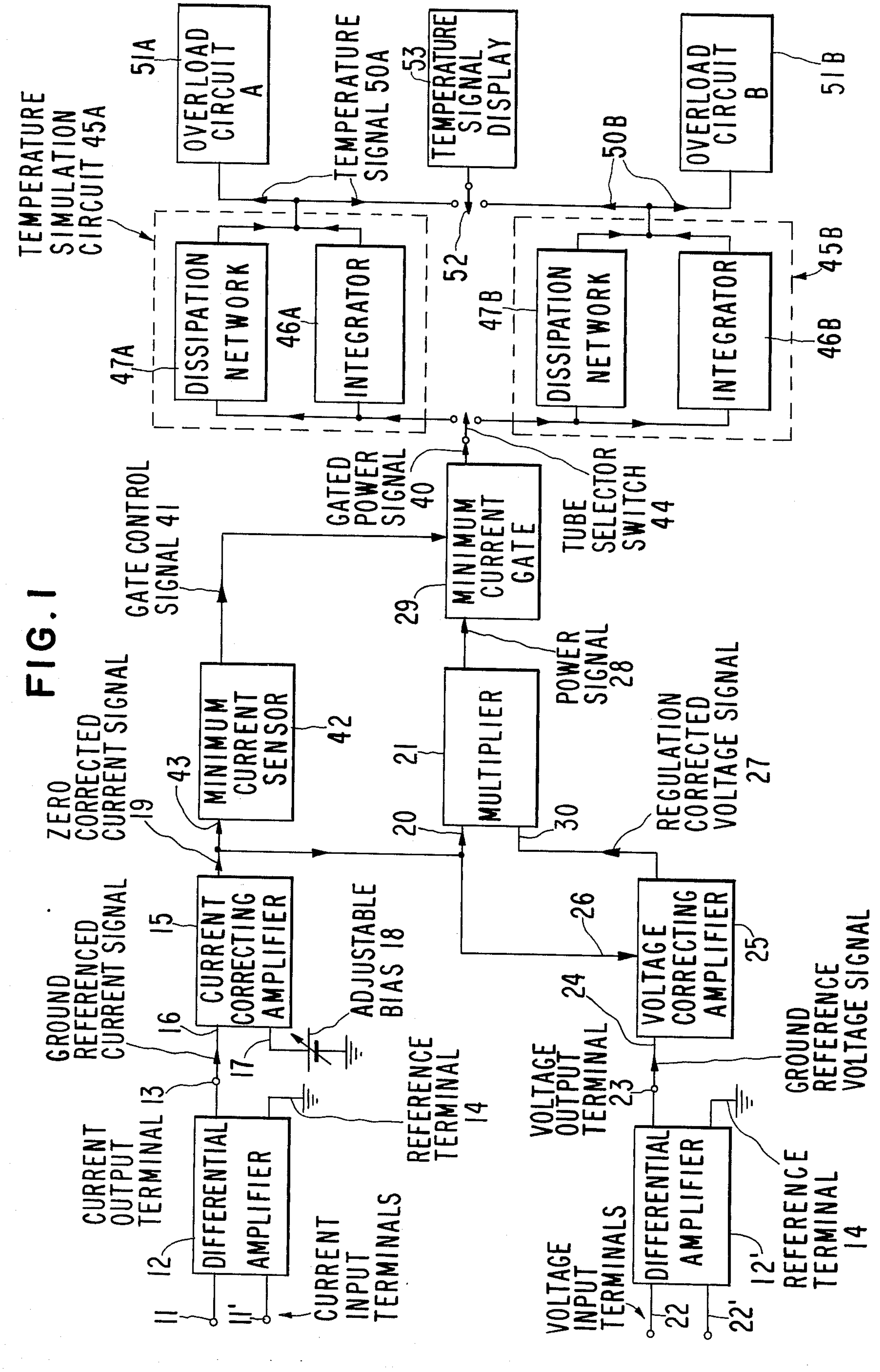
FIG. 1 is a block diagram of the heat unit integrator.

FIG. 1 shows a block diagram of a heat unit integrator. For clarity, common ground terminals of various circuit function blocks are omitted. Except where otherwise indicated, all signals are referenced to ground. Current input terminals 11, 11' are designed for connection across a resistor (not shown) in series with the X-ray tube current supply so that the voltage difference between them measures the current. Terminals 11, 11' are connected to a differential amplifier 12 which produces a voltage on current output terminal 13 with respect to ground reference terminal 14 which is proportional to the input voltage across 11, 11'. This ground-referenced current signal drives one input 16 of a current correcting differential amplifier 15. The other input 17 of amplifier 15 is supplied with an adjustable bias voltage 18 with respect to ground 14. In operation bias 18 is set to make the corrected output current signal 19 from amplifier 15 equal to zero when the X-ray tube cathode is cold and no electron current flows, thus compensating for spurious displacement current and leakage errors which appear on the current signal.

The zero-corrected current signal 19 goes to one input 20 of a multiplier circuit 21.

Voltage input terminals 22, 22' are designed for connection to a tap on the primary of the X-ray power transformer (not shown). The voltage difference signal between them is indicative of the tube voltage. Terminals 22, 22' are connected to the two inputs of a second differential amplifier 12' to produce on its output terminal 23 a voltage signal referenced to ground 14 proportional to the input voltage between 22 and 22'. The ground referenced voltage signal is fed to input 24 of voltage correcting amplifier 25 whose gain is controlled by the corrected current signal 19 applied to a gain control terminal 26. The response of amplifier 25 to the signal on gain control 26 is adjusted to compensate for the voltage drop in the secondary of the X-ray power transformer as electron current is drawn by the tube. The output 27 of amplifier 26, a signal indicative of the true tube voltage, is fed to the other input 30 of multiplier circuit 21. The output of multiplier 21 is a power signal 28 indicative of the product of corrected current signal 19 and voltage signal 27, and thus of the actual power delivered to the tube target.

Power signal 28 goes to a gate circuit 29 which transmits a gated power signal 40 only when it receives a gate control signal 41 from a minimum current sensor circuit 42. The input 43 of sensor 42 is fed the corrected current signal 19. Sensor 42 generates a gate control signal 41 only when current signal 19 exceeds a predetermined value indicative of the minimum actual current which in operation may be drawn by the tube and thus when the tube is in fact in use. During the long periods between exposures gate 29 remains open and prevents passage of spurious power signals which may be of low value but capable of adding up to an appreciable error over the long inactive periods the gate may be set to remain open for a preselected time delay after the current falls below the predetermined value, to avoid premature turn-off due to ac transients.

The gated power signal 40 from gate 29 goes through a selector switch 44 to one of a number of temperature simulation circuits 45A, B, each consisting of an integrator 46 and a dissipation network 47. Integrator 46 integrates with respect to time the gated power signal 40 to store a temperature signal 50 simulating the total heat storage in the target and hence its temperature. Dissipation network 47 dissipates temperature signal 50 with time at a rate dependent on the indicated value of temperature to simulate the radiation cooling of the target. The parameters of circuits 45 are adjustable to conform to the known thermal properties of a particular tube target. Temperature signal 50 is connected to an overload circuit 51 which is preset to deliver an alarm and/or turn off the tube when a dangerous temperature is reached.

Temperature signals 50A, 50B are connected to terminals of a selector switch 52 which conducts the one signal 50 pertaining to the tube being operated to a display device 53, such as a digital voltmeter, indicating the instantaneous temperature and readable by an operator.

Figure 2:
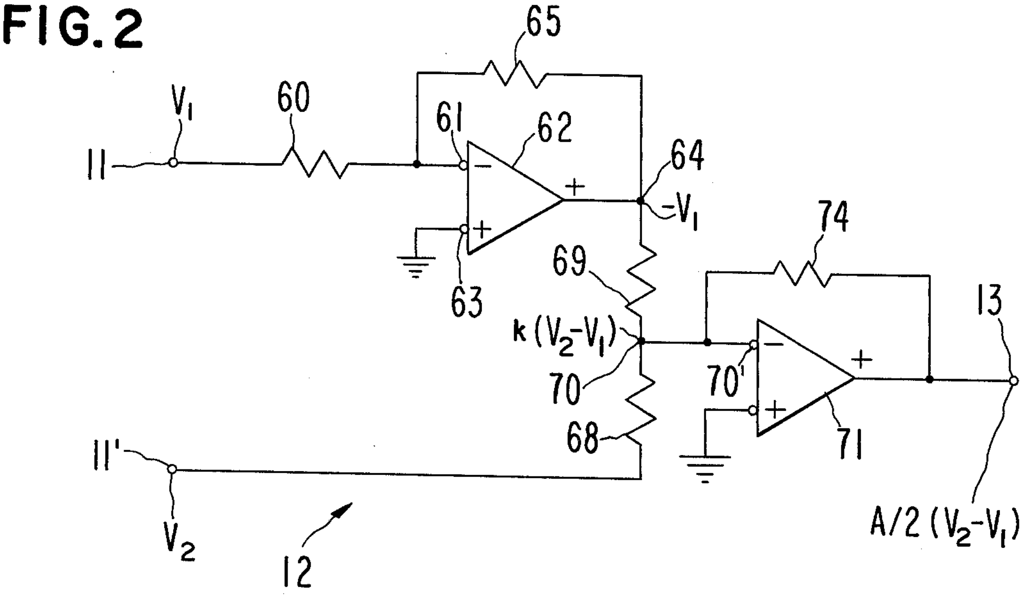
FIG. 2 is a schematic diagram of the ground referencing circuitry for input signals.

In FIG. 2 is shown a more detailed diagram, partly in block form, of differential amplifier 12. Signal input terminal 11 carrying input voltage $V_1$ with respect to ground is connected through input buffer resistor 60 to ungrounded input terminal 61 of an amplifier 62 whose other input terminal 63 is grounded. The output 64 of amplifier 62, of inverse polarity to input 61, is connected via a feedback resistor 65 to input 61. With feedback resistor 65 equivalent to input resistor 60 and very high internal gain, the degenerated gain of amplifier 62 is minus unity whereby the output voltage on terminal 64 referred to ground is $-V_1$. The other signal input terminal 11' carrying voltage $V_2$ with respect to ground is connected to output 64 through two equal series resistors 68 and 69. The intermediate connection 70 of resistors 68 and 69 thus has a voltage, when connected to alinear load, proportional to the mean of $V_2$ and ($-V_1$). Intermediate connection 70 is connected to the ungrounded input 70' of a second inverting amplifier 71 whose output is the output terminal 13 of FIG. 1. Terminal 13 is also connected via a feedback resistor 74 to input 70', whereby the degenerated gain and input impedance of amplifier 71 are made constant and linear, and output voltage to ground on terminal 13 is proportional to $V_2-V_1$. If the internal gain of amplifier 71 is very high and resistor 74 is equivalent to 68 and 69, the output voltage is exactly $V_2-V_1$.

Figure 3:
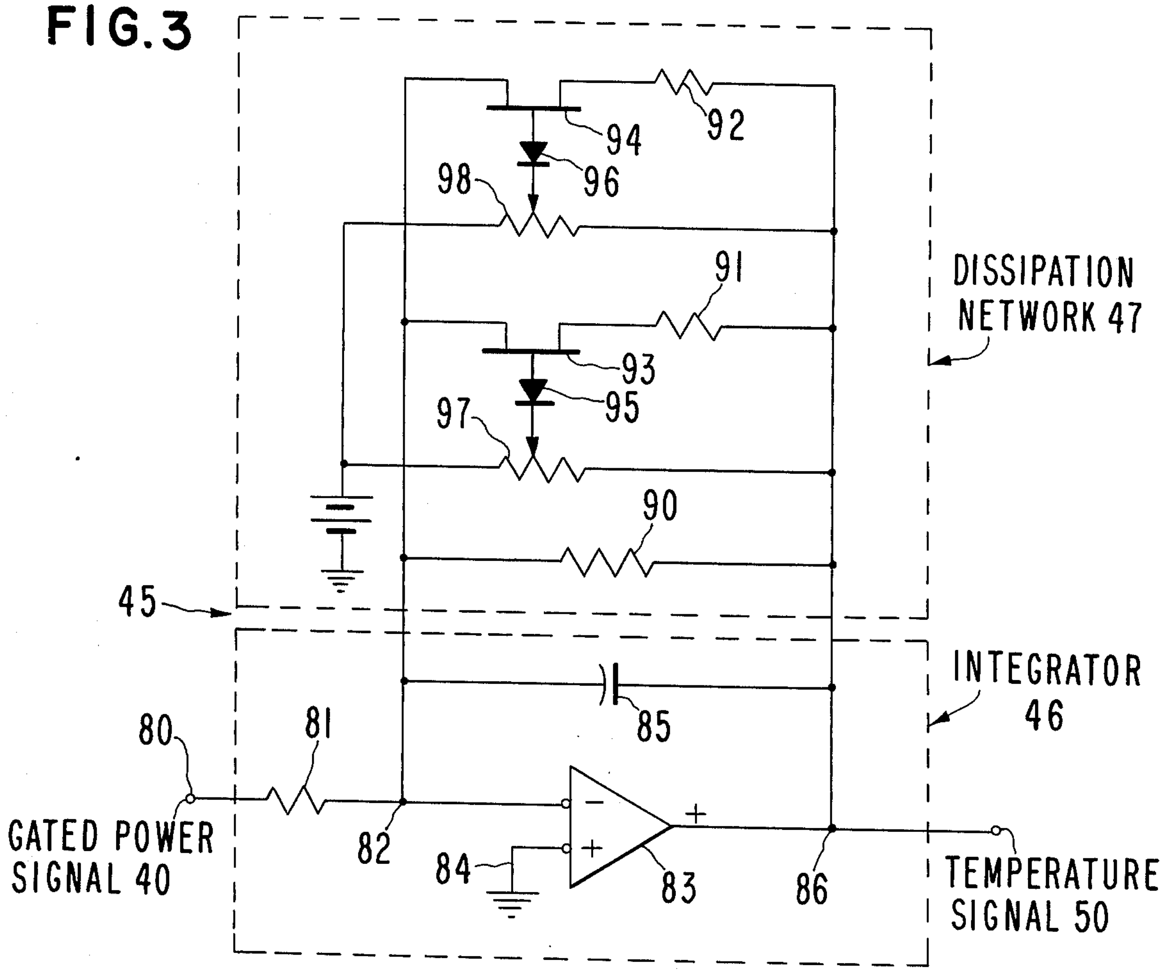
FIG. 3 is a schematic circuit diagram of the integrator and dissipation network.

FIG. 3 is a circuit diagram, partly in block form, of temperature simulation circuit 45. The gated power signal voltage 40 from tube selector switch 44 is fed to input terminal 80 of integrator 46. Terminal 80 connected through input resistor 81 to the ungrounded input terminal 82 of an inverting amplifier 83. Storage capacitor 85 is connected between input 82 and the output terminal 86 of amplifier 83 forming a feedback loop such that when amplifier 83 has very high gain the voltage on input terminal 82 is held close to zero and current flows through capacitor 85 equal to the current through input resistor 81, which is the ratio of the signal voltage 40 to the resistance of 81. In effect, the signal voltage is converted to a proportional constant current which stores a charge in condenser 85 proportional to the product of power signal voltage and its duration. The charge, and hence the voltage on condenser 85 are thus proportional to the integrated energy input to the tube target, and hence its temperature rise. The voltage on output terminal 86 is the temperature signal 50 of FIG. 1.

Dissipation network 47 connected across condenser 85 comprises parallel resistors 90, 91, 92. Resistors 91 and 92 are switched across the circuit by series gates 93 and 94, e.g. field effect transistors whose control electrodes 95 and 96 are driven by the voltage on condenser 85 referred to an adjustable bias on potentiometers 97 and 98. The biases are set so that as the temperature signal voltage increases, resistors 91 and 92 are successively switched in parallel with resistor 90, increasing the discharge rate of condenser 85 to simulate the rapid increase of radiation cooling of the target with increased temperature compared to the exponential increase which would be simulated by a simple resistor-capacitor circuit.

Other blocks of FIG. 1 represent signal operation functions performable by circuitry well-known to those skilled in the art, the invention lying not in their detailed circuitry but in the novel combination producing an improved and novel, useful result.

The invention has been illustrated by circuits using dc voltage analog techniques. However, many other analog techniques may be discerned by those skilled in the art, such as digital signal processing of analog-to-digital converted signals, ac carrier signals, etc. without departing from the spirit and novelty of the invention. Accordingly, the invention is interpreted to be limited only as set forth in the claims and their legal equivalents.

What is claimed is:

1. In apparatus for indicating the temperature of the target of an X-ray tube having a target and a cathode comprising;

means for generating a power signal indicative of instantaneous power input to said target, means for integrating said power signal with respect to time to generate a temperature signal indicative of the heat energy storage in said target, means to dissipate said temperature signal simulating heat loss from said target, said means for generating said power signal comprising a pair of input terminals for receiving therebetween an input voltage signal proportional to the target voltage between said cathode and said target, a pair of input terminals for receiving an input current signal therebetween proportional to the electron current from said cathode to said target, means for combining said input voltage and current signals to produce a power signal indicative of the product of said voltage and said current;

the improvement comprising differential amplifier means connected between at least one of said input terminals and said combining means, for converting said input signals to signals between a common reference terminal and single voltage and current terminals whereby errors in combining said signals are reduced.

2. The apparatus of claim 1 wherein said differential amplifier means comprises; a first buffer amplifier with a common ground terminal connected to said reference terminal, an input connected to one of said pair of input terminals and an output of first polarity with respect to said input connected to said single terminal, a second buffer amplifier with a common ground terminal connected to said reference terminal, an input connected to the other of said pair of input terminals and an output of polarity opposite said first polarity connected by a network to said single terminal, an intermediate point of said network connected to said input of said first buffer amplifier whereby said output of said first buffer amplifier is proportional to the difference between said input signals.

3. In apparatus for indicating the temperature of the target of an X-ray tube having a target and a cathode means for generating a power signal indicative of instantaneous power input to said target, means for integrating said power signal with respect to time to generate a temperature signal indicative of the heat energy storage in said target, means to dissipate said temperature signal simulating heat loss from said target; said means for generating said power signal comprising, means for receiving a current signal indicative of electron current flowing to said target, means for receiving a voltage signal indicative of the voltage between the cathode and said target, means for multiplying said current and voltage signals to produce said power signal; the improvement comprising means for adding an adjustable correction signal to said current signal such that the corrected current signal indicates zero when said electron current is zero, whereby errors in said power signal due to leakage and displacement currents are reduced.

4. The apparatus of claim 3 wherein said correcting means comprises a differential amplifier having a first input connected to said differential current signal and a second input connected to an adjustable bias.

5. In apparatus for indicating the temperature of the target of an X-ray tube having a target and a cathode; means for generating a power signal indicative of instantaneous power input to said target, means for integrating said power signal with respect to time to generate a temperature signal indicative of the heat energy storage in said target, means to dissipate said temperature signal simulating heat loss from said target, said means for generating said power signal comprising, means for receiving a current signal indicative of electron current flowing to said target and means for receiving an input voltage signal indicative of the primary voltage of a transformer whose secondary supplies voltage between said X-ray tube cathode and said target and means for combining said current signal and said voltage signal to generate a power signal indicative of the product of said current and said voltage; the improvement comprising correcting means responsive to said current signal connected between said input voltage signal and said combining means, for correcting said voltage signal to compensate for the voltage drop in said secondary of said transformer as electron current is drawn, whereby the voltage signal received by said combining means is proportional to said voltage between said cathode and said target.

6. The apparatus of claim 5 wherein said correcting means comprises an amplifier for said voltage signal, said amplifier having gain controlled by said current signal.

7. In apparatus for indicating the temperature of an X-ray tube target; means for generating a power signal indicative of instantaneous power input to said target, means for integrating said power signal with respect to time to generate a temperature signal indicative of the heat energy storage in said target, means to dissipate said temperature signal simulating heat loss from said target, said means for generating said power signal comprising, means for receiving an input current signal indicative of electron current flowing to said target, means for receiving a voltage signal indicative of voltage between the cathode and said target and means for combining said current signal and said voltage signal to generate said power signal indicative of the product of said current and said voltage, the improvement comprising means responsive to said current signal for gating said integrating means to integrate said power signal only during time periods within which said current signal exceeds a pre-selected value, whereby errors due to integrating small spurious signals over long time periods are reduced.

8. The apparatus of claim 7 wherein said time periods are the periods throughout which said current exceeds said pre-selected value.

9. The apparatus of claim 7 wherein said time periods start when said current exceeds said pre-selected value and stop at a pre-selected time delay after said current falls below said pre-selected value.

10. Apparatus for indicating the temperatures of a plurality of X-ray tube targets comprising; means for generating a power signal indicative of instantaneous power input to any of said targets, analog circuit means corresponding to each of said targets for simulating the temperature of said target, each analog means comprising means for integrating said power signal with respect to time to generate a temperature signal indicative of the heat storage in said target and means to dissipate said temperature signal to simulate heat loss from said target, means for indicating the instantaneous value of one of said temperature signals, means for switching said power signal to the one of said analog circuit means corresponding to the one of said targets energized, and means for switching said indicating means to any one of said analog circuit means.

11. The apparatus of claim 10 wherein each of said analog circuit means is suited to retain and dissipate said temperature signal independently of its state of connection to said power signal and said indicating means.

* * * * *